United States Patent
Mukai et al.

(10) Patent No.: US 9,906,403 B2
(45) Date of Patent: Feb. 27, 2018

(54) SLAVE STATION DEVICE, MASTER STATION DEVICE, OPTICAL COMMUNICATION SYSTEM, AND MALFUNCTION DETECTION METHOD

(71) Applicant: MITSUBISHI ELECTRIC CORPORATION, Chiyoda-ku (JP)

(72) Inventors: Hiroaki Mukai, Tokyo (JP); Takashi Nishitani, Tokyo (JP)

(73) Assignee: MITSUBISHI ELECTRIC CORPORATION, Chiyoda-ku (JP)

(*) Notice: Subject to any disclaimer, the term of this patent is extended or adjusted under 35 U.S.C. 154(b) by 0 days.

(21) Appl. No.: 15/503,920

(22) PCT Filed: Aug. 26, 2014

(86) PCT No.: PCT/JP2014/072279
§ 371 (c)(1),
(2) Date: Feb. 14, 2017

(87) PCT Pub. No.: WO2016/030961
PCT Pub. Date: Mar. 3, 2016

(65) Prior Publication Data
US 2017/0279665 A1 Sep. 28, 2017

(51) Int. Cl.
*H04L 12/24* (2006.01)
*H04Q 11/00* (2006.01)
*H04J 14/02* (2006.01)

(52) U.S. Cl.
CPC ...... *H04L 41/0668* (2013.01); *H04J 14/0212* (2013.01); *H04L 41/069* (2013.01);
(Continued)

(58) Field of Classification Search
CPC .. H04J 14/0246; H04J 14/025; H04J 14/0282; H04J 14/0227; H04J 14/0257;
(Continued)

(56) References Cited

U.S. PATENT DOCUMENTS 5,864,415 A * 1/1999 Williams ............ H04B 10/272
370/907
5,880,864 A * 3/1999 Williams ............ H04J 14/0227
398/1
(Continued)

FOREIGN PATENT DOCUMENTS

JP 2012-129644 A 7/2012
JP 2012-130079 A 7/2012
(Continued)

OTHER PUBLICATIONS

ITU-T Telecommunication Standardization Sector of ITU, G. 989.1, "Series G: Transmission Systems and Media, Digital Systems and Networks, Digital sections and digital line system—Optical line systems for local and access networks, 40-Gigabit-capable passive optical networks (NG-PON2): General requirements", International Telecommunication Union, Total 21 Pages, (Mar. 2013).
(Continued)

*Primary Examiner* — David Payne
*Assistant Examiner* — Tanya Motsinger
(74) *Attorney, Agent, or Firm* — Oblon, McClelland, Maier & Neustadt, L.L.P.

(57) ABSTRACT

An ONU receiving an optical signal from an OLT including PON controllers includes: an optical receiver to convert, into an electric signal, an optical signal having a single optical wavelength set out of plural optical wavelengths; and a control frame extractor to extract and hold wavelength correspondence information indicating correspondence between MAC addresses of the PON controllers received from the OLT and the optical wavelengths. The control frame extractor, when receiving a wavelength switching request, extracts the optical wavelength after wavelength switching instructed in the wavelength switching request, obtains a setting address of the MAC address of the PON controller to which the ONU itself should be connected after
(Continued)

the wavelength switching based on the extracted optical wavelength after the wavelength switching and the wavelength correspondence information, and determines whether a malfunction occurs based on a transmission source MAC address stored in a received control frame and the setting address.

8 Claims, 5 Drawing Sheets

(52) U.S. Cl.
CPC . *H04Q 11/0067* (2013.01); *H04Q 2011/0016* (2013.01); *H04Q 2011/0083* (2013.01)

(58) Field of Classification Search
CPC ............... H04J 14/0267; H04J 14/0238; H04J 14/0247; H04J 14/0252; H04B 10/675; H04B 10/0775; H04B 10/0795
USPC ...................................... 398/34, 1, 167.5, 95
See application file for complete search history.

(56) References Cited

U.S. PATENT DOCUMENTS

| | | | | |
|---|---|---|---|---|
| 6,043,922 | A * | 3/2000 | Koga | H04B 10/675 359/199.1 |
| 6,075,630 | A * | 6/2000 | Nishio | H04J 14/0227 398/1 |
| 6,738,354 | B1 * | 5/2004 | Ashwood Smith | A61N 7/02 370/248 |
| 7,317,874 | B2 * | 1/2008 | Li | H04B 10/506 398/67 |
| 7,460,469 | B2 * | 12/2008 | Goldberg | H04J 3/14 370/218 |
| 7,660,529 | B2 * | 2/2010 | Wei | H04B 10/032 398/192 |
| 8,095,004 | B2 * | 1/2012 | Mizutani | H04J 14/0282 398/167.5 |
| 8,687,956 | B2 * | 4/2014 | Li | H04J 14/0284 370/227 |
| 8,744,265 | B2 * | 6/2014 | Effenberger | H04B 10/272 398/14 |
| 8,811,819 | B2 | 8/2014 | Kazawa et al. | |
| 9,236,971 | B2 * | 1/2016 | Tamaki | H04L 12/12 |
| 9,420,357 | B2 * | 8/2016 | Jeong | H04Q 11/0005 |
| 2006/0268944 | A1 * | 11/2006 | Xu | H04Q 11/0062 370/351 |
| 2010/0216414 | A1 * | 8/2010 | Muterspaugh | H04B 7/01 455/83 |
| 2011/0081147 | A1 * | 4/2011 | Lee | H04L 41/0803 398/48 |
| 2011/0116790 | A1 * | 5/2011 | Sakauchi | H04J 14/0204 398/5 |
| 2012/0189301 | A1 * | 7/2012 | Ghiggino | H04J 14/0227 398/34 |
| 2012/0224850 | A1 * | 9/2012 | Cavaliere | H04J 14/00 398/34 |
| 2012/0328287 | A1 * | 12/2012 | Grosso | H04J 14/0282 398/34 |
| 2013/0028598 | A1 * | 1/2013 | Cavaliere | H04B 10/071 398/34 |
| 2013/0121685 | A1 * | 5/2013 | Rao | H04J 14/0212 398/17 |
| 2013/0230316 | A1 * | 9/2013 | Hussain | H04J 14/0272 398/34 |
| 2014/0161446 | A1 * | 6/2014 | Lee | H04J 14/0221 398/34 |
| 2015/0155934 | A1 * | 6/2015 | Nakagawa | H04B 10/0775 398/34 |
| 2015/0381305 | A1 * | 12/2015 | Roberts | H04J 14/0221 398/34 |
| 2017/0171647 | A1 * | 6/2017 | Gao | H04Q 11/0005 |
| 2017/0279665 | A1 * | 9/2017 | Mukai | H04L 41/0668 |

FOREIGN PATENT DOCUMENTS

| | | |
|---|---|---|
| JP | 2013-110772 A | 6/2013 |
| JP | 5314760 B2 | 10/2013 |
| WO | 2013/094594 A1 | 6/2013 |

OTHER PUBLICATIONS

International Search Report dated Sep. 30, 2014 in PCT/JP2014/072279 Filed Aug. 26, 2014.

* cited by examiner

| MAC ADDRESS | WAVELENGTH |
|---|---|
| ADDRESS #1 | $\lambda_{11}$ |
| ADDRESS #2 | $\lambda_{12}$ |
| ⋮ | ⋮ |

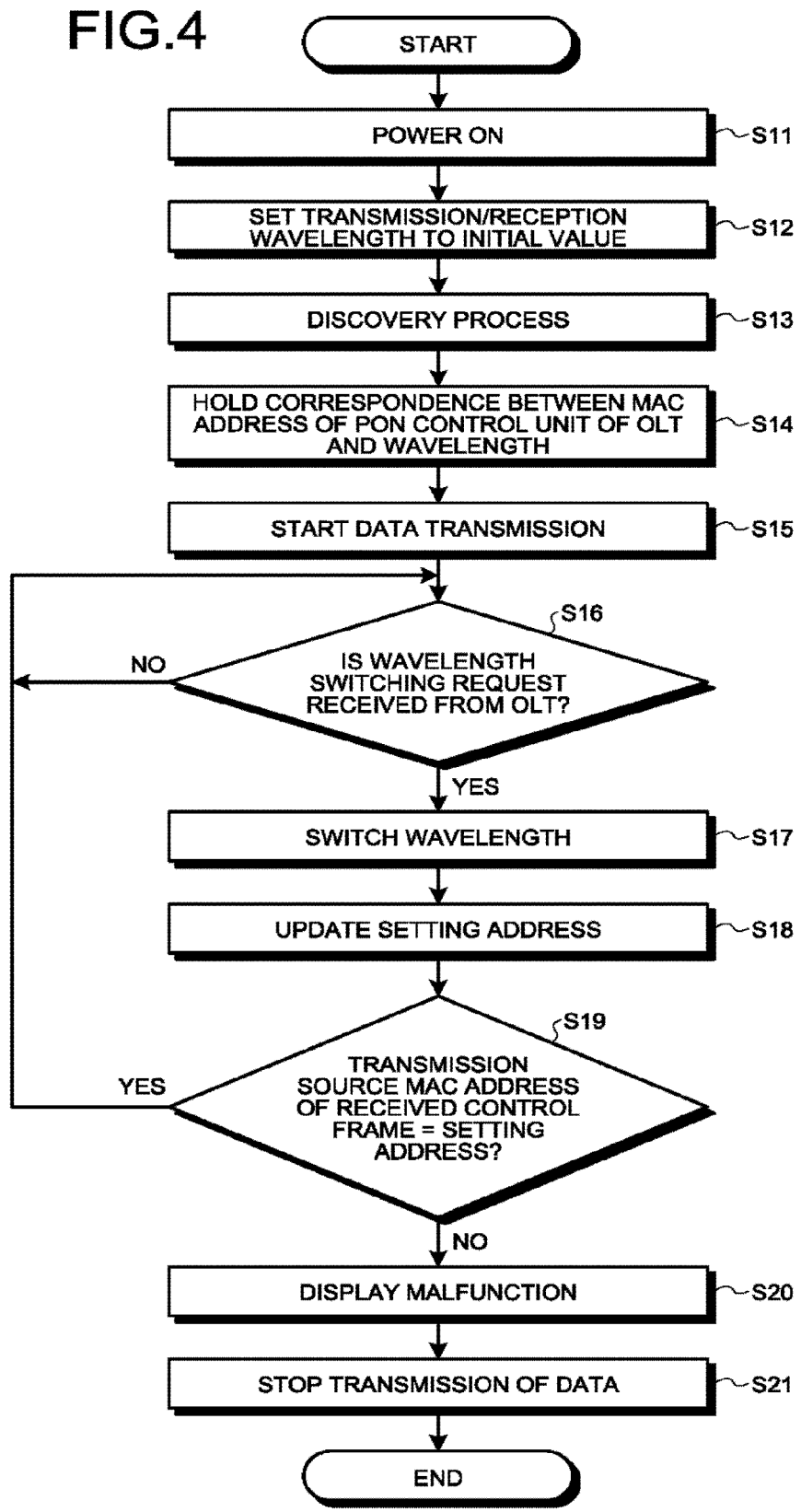

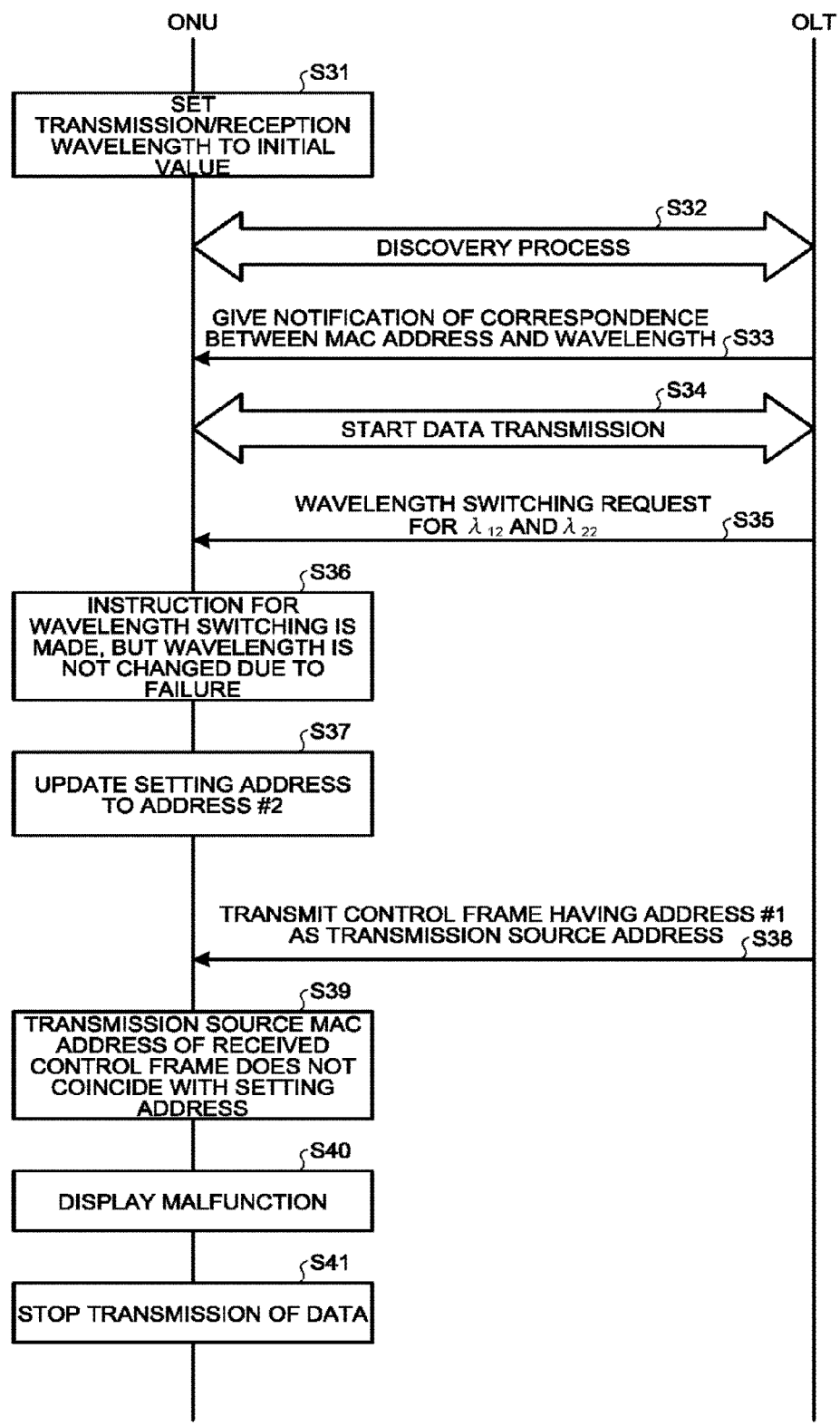

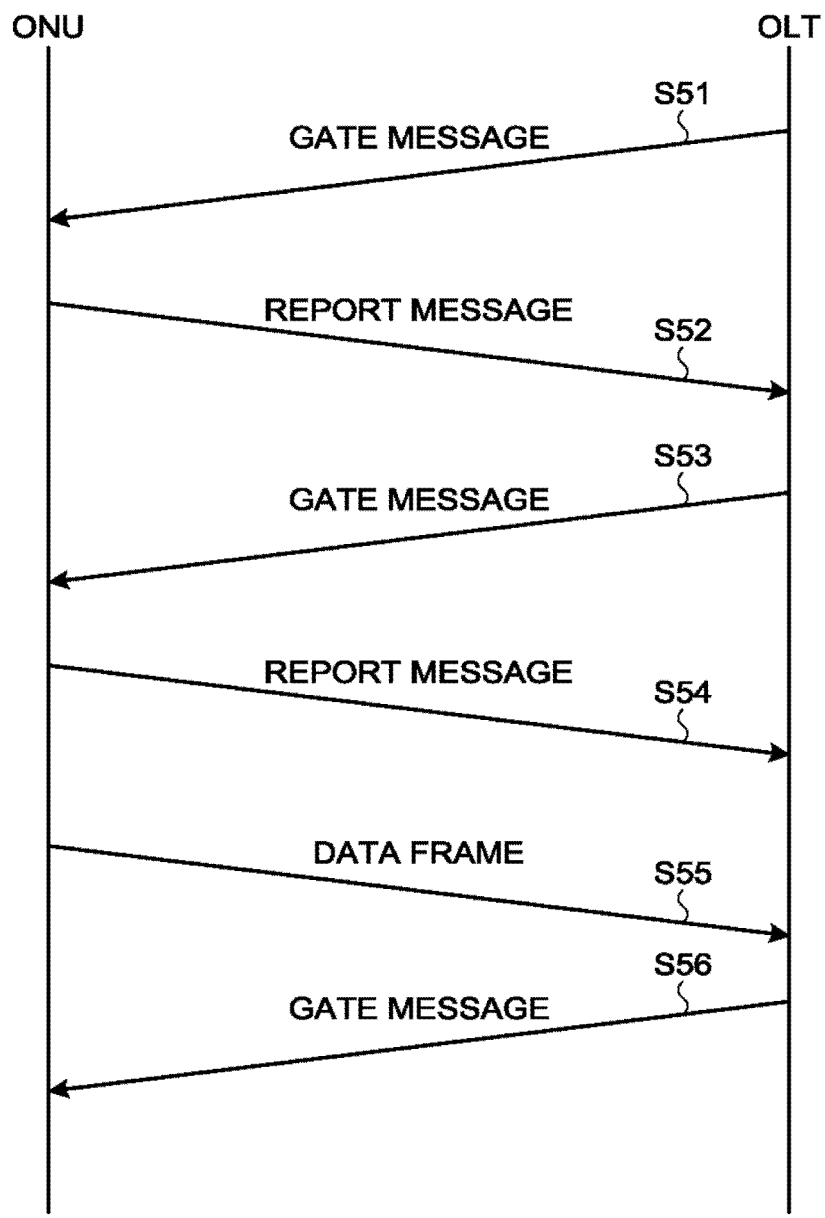

SLAVE STATION DEVICE, MASTER STATION DEVICE, OPTICAL COMMUNICATION SYSTEM, AND MALFUNCTION DETECTION METHOD

FIELD

The present invention relates to an optical communication system that performs optical transmission using a plurality of optical wavelengths.

BACKGROUND

An exemplary form of an access network includes a passive optical network (PON) system. Due to a recent increase in data traffic in the access network, a conventional time division multiplexing (TDM) PON system suffers from an insufficient band. Therefore, as described in Patent Literature 1 and Non Patent Literature 1, a time and wavelength division multiplexing (TWDM)-PON system has been examined. Specifically, an optical line terminal (OLT) has a plurality of optical wavelength channels that is used by an optical network unit (ONU), i.e., a slave station device, and the number of ONUs that perform the TDM in a single optical wavelength channel is reduced, whereby transmission capacity per ONU is increased.

CITATION LIST

Patent Literature

Patent Literature 1: Japanese Patent No. 5314760

Non Patent Literature

Non Patent Literature 1: International Telecommunication Union Telecommunication Standardization Sector (ITU-T) standard G.989.1, March 2013

SUMMARY

Technical Problem

However, if an ONU that uses a fixed wavelength, that is, a colored ONU, a type of which depends on a difference in wavelength for use, is used in a system that uses a plurality of optical wavelength channels by means of a point-to-multipoint optical fiber, a communication carrier needs to manage correspondence between the type of the ONU and an installation place when the communication carrier installs the ONU in a field. Therefore, the management of the device is complicated. This also causes such a problem that failure is increased due to a human error during installation work.

As a method for solving this problem, a TWDM-PON system that uses a colorless ONU capable of changing an optical transmission/reception wavelength has been examined. In the colorless ONU capable of changing the optical transmission/reception wavelength, one wavelength can be set out of a plurality of optical transmission wavelengths. Note that, hereinafter, the optical wavelength is simply referred to as a wavelength. In the TWDM-PON system, an OLT serving as a master station device manages the wavelengths that are used for the transmission and the reception by ONUS serving as slave station devices. In addition, in the TWDM-PON system, each ONU transmits a signal in a transmission time slot permitted by the OLT in uplink communication directed from the ONU to the OLT. In downlink communication directed from the OLT to the ONUS, the OLT multiplexes, for each wavelength, signals for the ONUS that use the wavelength for reception. Each ONU extracts a signal addressed to the ONU itself from the signals received using the set reception wavelength.

In the above-mentioned TWDM-PON system, in a case where the ONU incorrectly sets the wavelength for use due to a malfunction such as a breakdown, the ONU receives the signal using a wavelength different from the wavelength corresponding to the ONU itself, that is, the wavelength grasped by the OLT as the reception wavelength for the ONU. In a case where the ONU succeeds in receiving the signal itself, and does not receive a signal addressed to the ONU itself for a certain period or more, the ONU cannot distinguish whether the OLT just does not transmit the signal addressed to the ONU itself or the incorrect setting of the wavelength occurs. This results in such a problem that the ONU cannot detect the incorrect setting of the wavelength for the ONU itself.

The present invention has been made in consideration of the above-mentioned circumstances, and an object thereof is to obtain an ONU, namely, a slave station device, capable of detecting incorrect setting of a wavelength.

Solution to Problem

There is provided a slave station device according to an aspect of the present invention to receive an optical signal from a master station device including two or more master station control units. The slave station device includes: an optical receiver capable of dealing with a plurality of optical wavelengths to receive, from the master station device, an optical signal having a single optical wavelength set out of the plurality of optical wavelengths, and convert the received optical signal into an electric signal; and a malfunction detection unit to extract and hold wavelength correspondence information, stored in the electric signal, indicating correspondence between the master station control units and the optical wavelengths used for transmitting control signals generated by the respective master station control units, to extract, when the electric signal is a wavelength switching request that requests a switch of the wavelength for the optical receiver, information on the optical wavelength after wavelength switching instructed in the wavelength switching request, and to obtain setting identification information that is identification information of the master station control unit to which the slave station device itself should be connected after the wavelength switching based on the extracted information of the optical wavelength after the wavelength switching and the wavelength correspondence information, and to determine, when the electric signal is the control signal, whether a malfunction occurs based on identification information of the master station control unit that is a transmission source of the control signal stored in the control signal, and on the setting identification information.

Advantageous Effects of Invention

A slave station device according to the present invention achieves an effect of detecting incorrect setting of a wavelength.

BRIEF DESCRIPTION OF DRAWINGS

FIG. 4 is a flowchart illustrating exemplary operation of an ONU.

FIG. 5 is a chart illustrating exemplary operation of the OLT and ONU on the occurrence of a malfunction in the ONU.

FIG. 6 is a diagram illustrating exemplary operation after the start of data transmission between the ONU and the OLT with the use of a GATE message.

DESCRIPTION OF EMBODIMENTS

Hereinafter, an embodiment of a slave station device, a master station device, an optical communication system, and a malfunction detection method according to the present invention will be described in detail based on the drawings. The present invention is not limited to the embodiment.

Embodiment

Figure 1:
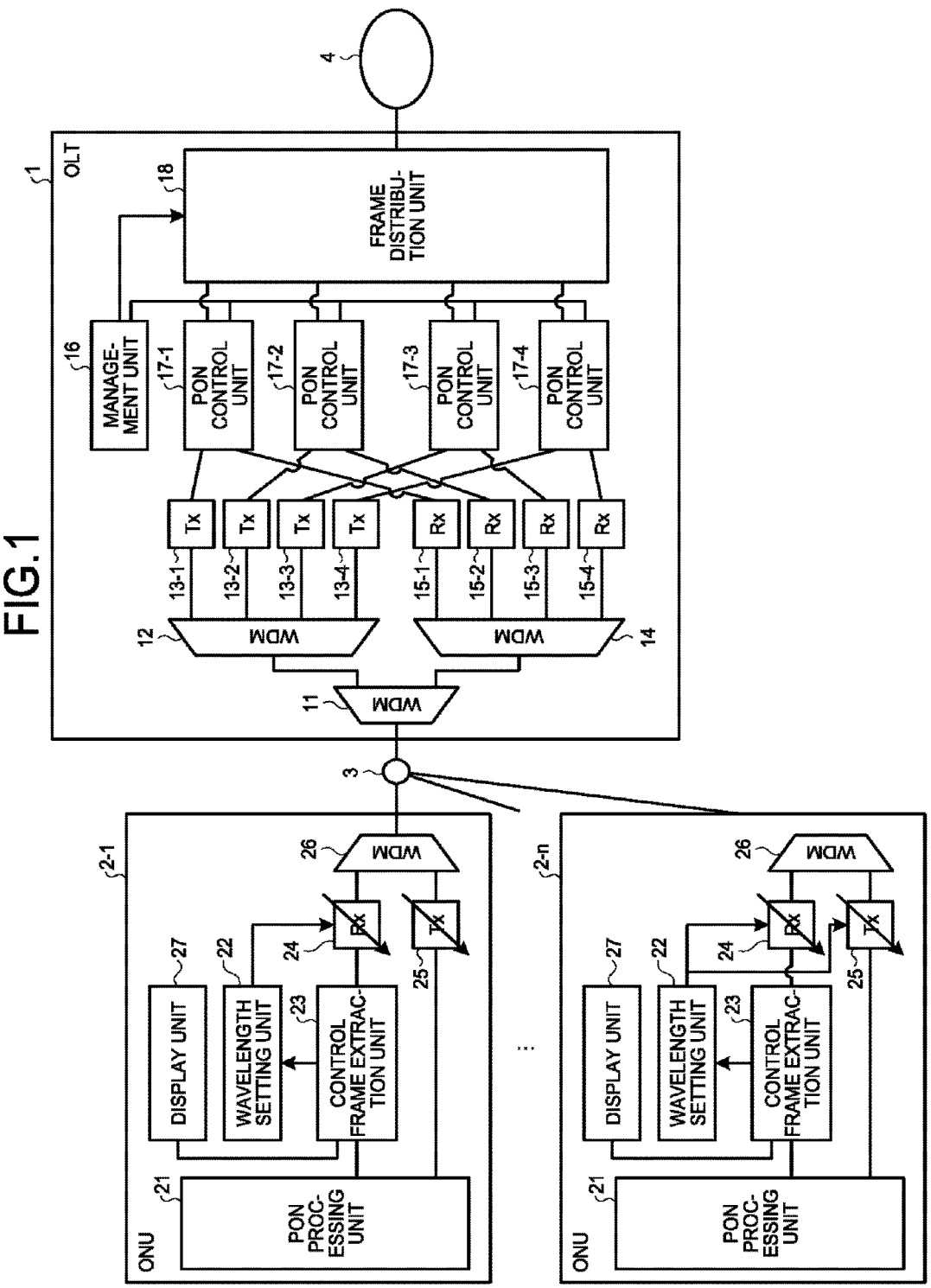
FIG. 1 is a diagram illustrating an exemplary configuration of an optical communication system according to the present invention.

FIG. 1 is a diagram illustrating an exemplary configuration of an optical communication system according to the present invention. In the present embodiment, a TWDM-PON system will be described as an example of the optical communication system according to the present invention. As illustrated in FIG. 1, the optical communication system of the present embodiment includes an OLT 1 serving as a master station device, ONUs 2-1 to 2-n serving as slave station devices, and a splitter 3 coupled to the OLT 1 by an optical fiber and coupled to the ONUs 2-1 to 2-n by optical fibers. Note that n is an integer of two or more. Although the optical communication system including the plurality of ONUs is illustrated in the example of FIG. 1, the optical communication system may include a single ONU. The splitter 3 causes an optical signal received from the OLT 1 to branch off, and outputs the branched optical signal to each of the optical fibers connected to the respective ONUs 2-1 to 2-n. The splitter 3 also combines optical signals received from the ONUs 2-1 to 2-n, and outputs the combined optical signal to the optical fiber connected to the OLT 1. The OLT 1 is connected to a higher-level network 4.

The optical communication system of the present embodiment can use four wavelengths, i.e., $\lambda_{11}$, $\lambda_{12}$, $\lambda_{13}$, and $\lambda_{14}$, for downlink communication directed from the OLT 1 to the ONUs 2-1 to 2-n, and can use four wavelengths, i.e., $\lambda_{21}$, $\lambda_{22}$, $\lambda_{23}$, and $\lambda_{24}$, for uplink communication directed from the ONUs 2-1 to 2-n to the OLT 1. The wavelengths $\lambda_{11}$, $\lambda_{12}$, $\lambda_{13}$, $\lambda_{14}$, $\lambda_{21}$, $\lambda_{22}$, $\lambda_{23}$, and $\lambda_{24}$ are different from one another.

The OLT 1 includes a WDM 11, a WDM 12, and a WDM 14. The WDM 11 multiplexes an optical signal to be transmitted to the ONUs 2-1 to 2-n and an optical signal received from the ONUs 2-1 to 2-n. The WDM 12 combines optical signals having the respective wavelengths and outputs the combined optical signal to the WDM 11. The WDM 14 separates an optical signal input from the WDM 11 into optical signals having the respective wavelengths. The OLT 1 also includes optical transmitters 13-1 to 13-4, optical receivers 15-1 to 15-4, a management unit 16, PON control units 17-1 to 17-4, and a frame distribution unit 18. Each of the optical transmitters 13-1 to 13-4 converts an electric signal to be transmitted into an optical signal. The optical receivers 15-1 to 15-4 convert the optical signals having the respective wavelengths input from the WDM 14 into electric signals. The management unit 16 manages the wavelengths that are used for the transmission and the reception by each ONU. The PON control units 17-1 to 17-4 are master station control units that control the OLT side in accordance with a PON protocol. The frame distribution unit 18 distributes frames received from the higher-level network 4 to the corresponding PON control units 17-1 to 17-4. In FIG. 1, the optical transmitters are abbreviated to Tx, and the optical receivers are abbreviated to Rx.

The above-mentioned PON protocol is a control protocol that is used in a media access control (MAC) layer or the like that is a sublayer of layer 2. Examples of the PON protocol include multi-point control protocol (MPCP) and operation administration and maintenance (CAM) or the like defined by the Institute of Electrical and Electronic Engineers (IEEE), and physical layer OAM (PLOAM) and ONU management and control channel (OMCC) or the like defined by the ITU-T.

The PON control units 17-1 to 17-4 perform a process for the MAC layer in accordance with the PON protocol. MAC addresses that are addresses for the MAC layer are individually given to the respective PON control units 17-1 to 17-4. The PON control units 17-1 to 17-4 generate control frames, that is, control signals, to be transmitted to the ONUS 2-1 to 2-n as electric signals in accordance with the PON protocol. The PON control units 17-1 to 17-4 store the respective MAC addresses as transmission source addresses in the control frames to be transmitted. For the PON control units 17-1 to 17-4, the wavelength of an optical signal that is used for the transmission, i.e., the wavelength of an optical signal that is used for the downlink communication, and the wavelength of an optical signal that is used for the reception, i.e., the wavelength of an optical signal that is used for the uplink communication, are determined. Hereinafter, using an optical signal having a wavelength $\lambda_x$ is represented by an abbreviation "using the wavelength $\lambda_x$". In practice, the PON control units 17-1 to 17-4 do not output the optical signals, but the respectively corresponding optical transmitters 13-1 to 13-4 at a later stage output the optical signals having the wavelengths $\lambda_x$. However, a case where the corresponding optical transmitters 13-1 to 13-4 output the optical signals having the wavelengths $\lambda_x$ is represented by such an expression that the PON control units 17-1 to 17-4 "use the wavelengths $\lambda_x$" for simplifying the description. This example is based on the assumption that the PON control unit 17-1 uses the wavelength $\lambda_{11}$ for the downlink communication and uses the wavelength $\lambda_{21}$ for the uplink communication, the PON control unit 17-2 uses the wavelength $\lambda_{12}$ for the downlink communication and uses the wavelength $\lambda_{22}$ for the uplink communication, the PON control unit 17-3 uses the wavelength $\lambda_{13}$ for the downlink communication and uses the wavelength $\lambda_{23}$ for the uplink communication, and the PON control unit 17-4 uses the wavelength $\lambda_{14}$ for the downlink communication and uses the wavelength $\lambda_{24}$ for the uplink communication.

The optical transmitter 13-1 converts the electric signal input from the PON control unit 17-1 into the optical signal having the wavelength $\lambda_{11}$, and outputs it to the WDM 12. The optical transmitter 13-2 converts the electric signal input from the PON control unit 17-2 into the optical signal having the wavelength $\lambda_{12}$, and outputs it to the WDM 12. The optical transmitter 13-3 converts the electric signal input from the PON control unit 17-3 into the optical signal having the wavelength $\lambda_{13}$, and outputs it to the WDM 12. The optical transmitter 13-4 converts the electric signal input from the PON control unit 17-4 into the optical signal having the wavelength $\lambda_{14}$, and outputs it to the WDM 12. The WDM 12 multiplexes the optical signals input from the optical transmitters 13-1 to 13-4, and inputs the multiplexed optical signal to the WDM 11. The WDM 11 transmits the optical signal input from the WDM 12 to the ONUS 2-1 to 2-*n* through the optical fibers and the splitter.

The WDM 11 outputs, to the WDM 14, an optical signal in a wavelength band including the wavelengths that are used for the uplink communication, namely, $\lambda_{21}$, $\lambda_{22}$, $\lambda_{23}$, and $\lambda_{24}$. The WDM 14 demultiplexes the optical signal input from the WDM 11 into the four wavelengths, i.e. $\lambda_{21}$, $\lambda_{22}$, $\lambda_{23}$, and $\lambda_{24}$. The optical signal having the wavelength $\lambda_{21}$ subjected to the demultiplexing is input to the optical receiver 15-1, the optical signal having the wavelength $\lambda_{22}$ subjected to the demultiplexing is input to the optical receiver 15-2, the optical signal having the wavelength $\lambda_{23}$ subjected to the demultiplexing is input to the optical receiver 15-3, and the optical signal having the wavelength $\lambda_{24}$ subjected to the demultiplexing is input to the optical receiver 15-4. The optical receiver 15-1 converts the optical signal having the wavelength $\lambda_{21}$ into the electric signal, and inputs it to the PON control unit 17-1. The optical receiver 15-2 converts the optical signal having the wavelength $\lambda_{22}$ into the electric signal, and inputs it to the PON control unit 17-2. The optical receiver 15-3 converts the optical signal having the wavelength $\lambda_{23}$ into the electric signal, and inputs it to the PON control unit 17-3. The optical receiver 15-4 converts the optical signal having the wavelength $\lambda_{24}$ into the electric signal, and inputs it to the PON control unit 17-4.

For the ONU out of the ONUs 2-1 to 2-*n* that uses $\lambda_{11}$ for the downlink communication and uses $\lambda_{21}$ for the uplink communication, the PON control unit 17-1 determines a transmission time slot in which the uplink communication is permitted on each ONU basis in accordance with the PON protocol. The PON control unit 17-1 then notifies the ONU of the transmission time slot. For example, based on an uplink request band transmitted from the ONU using a control frame, the PON control unit 17-1 determines the transmission time slot unique to the ONU so that the transmission time slots for the ONUs do not overlap one another. More specifically, the PON control unit 17-1 generates a control frame for band notification in which the transmission time slot permitted for the ONU is stored, and outputs the control frame to the optical transmitter 13-1. Hereinafter, assuming that i is an integer of one to four, an ONU out of the ONUs 2-1 to 2-*n* that uses $\lambda_{1i}$ for the downlink communication and uses $\lambda_{2i}$ for the uplink communication with respect to the PON control unit 17-*i* is abbreviated to the ONU corresponding to the PON control unit 17-*i*.

In a manner similar to that for the PON control unit 17-1, each of the PON control units 17-2 to 17-4 determines, for the corresponding ONU, the transmission time slot in which the uplink communication is permitted on each ONU basis in accordance with the PON protocol. Each of the PON control units 17-2 to 17-4 then notifies the corresponding ONU of the transmission time slot.

The PON control unit 17-1 also generates a data frame in which downlink data input from the frame distribution unit 18 is stored. The PON control unit 17-1 inputs the control frame generated in accordance with the PON protocol and the data frame to the optical transmitter 13-1 as the electric signals. Similarly, the PON control unit 17-2 generates a data frame in which downlink data input from the frame distribution unit 18 is stored, and inputs the control frame generated in accordance with the PON protocol and the data frame to the optical transmitter 13-2 as the electric signals. The PON control unit 17-3 generates a data frame in which downlink data input from the frame distribution unit 18 is stored, and inputs the control frame generated in accordance with the PON protocol and the data frame to the optical transmitter 13-3 as the electric signals. The PON control unit 17-4 generates a data frame in which downlink data input from the frame distribution unit 18 is stored, and inputs the control frame generated in accordance with the PON protocol and the data frame to the optical transmitter 13-4 as the electric signals.

The PON control unit 17-1 also performs a process in accordance with the PON protocol in response to receiving a control frame from the ONU corresponding to the PON control unit 17-1. The PON control unit 17-1 also outputs uplink data to the higher-level network 4 through the frame distribution unit 18 in response to receiving a data frame in which the uplink data is stored from the ONU corresponding to the PON control unit 17-1. Similarly, each of the PON control units 17-2 to 17-4 performs a process in accordance with the PON protocol in response to receiving a control frame from the corresponding ONU, and outputs uplink data to the higher-level network 4 through the frame distribution unit 18 in response to receiving a data frame in which the uplink data is stored from the corresponding ONU.

Furthermore, the PON control units 17-1 to 17-4 respectively generate control frames in which correspondence between the MAC addresses of the PON control units 17-1 to 17-4 and the wavelengths that are used by the PON control units 17-1 to 17-4 is stored, and output the control frames to the corresponding optical transmitters 13-1 to 13-4. The correspondence is managed by the management unit 16, which will be described later. Hereinafter, the correspondence between the MAC addresses of the PON control units 17-1 to 17-4 and the wavelengths that are used by the PON control units 17-1 to 17-4 is referred to as wavelength correspondence information.

Figures 2, 3:
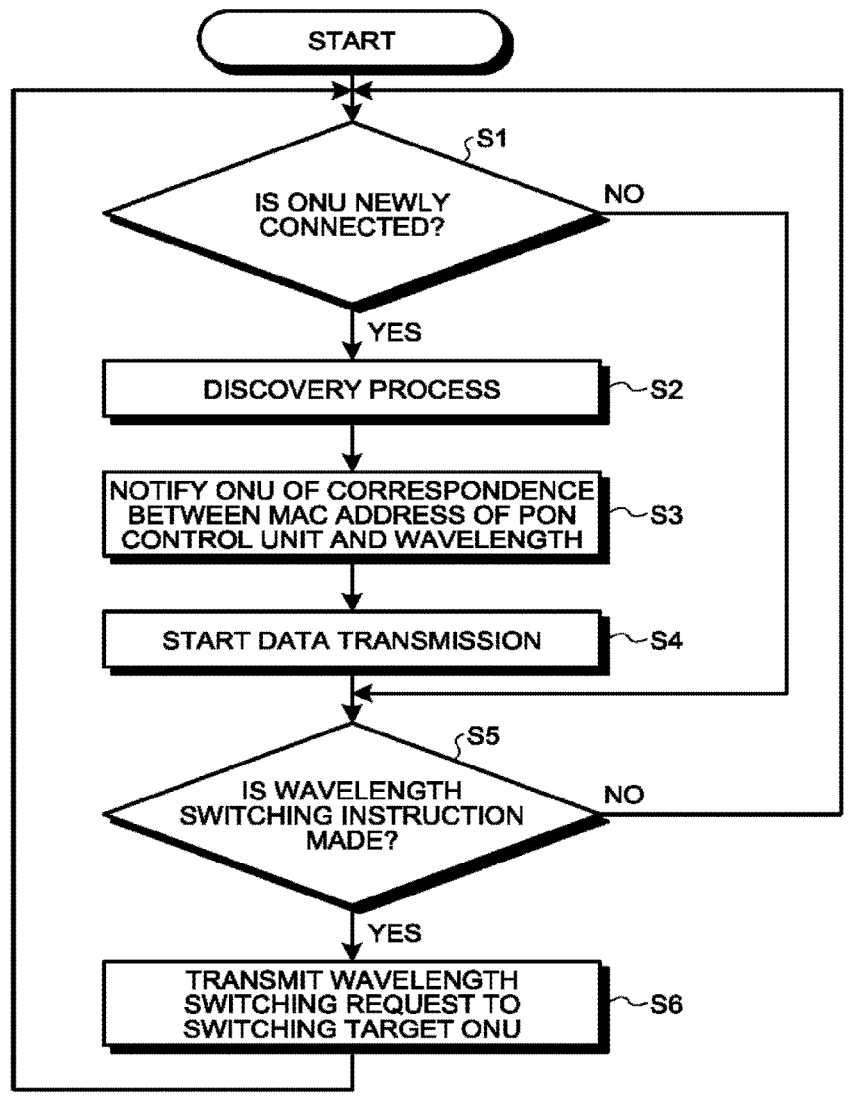
FIG. 2 is a diagram illustrating exemplary wavelength correspondence information.
FIG. 3 is a flowchart illustrating exemplary operation of an OLT.

FIG. 2 is a diagram illustrating exemplary wavelength correspondence information. The MAC addresses of the PON control units and the corresponding wavelengths that are used for the downlink communication are illustrated in the example of FIG. 2. Since the combination of the wavelengths for the transmission and the reception is fixed in this example, both the uplink wavelength and the downlink wavelength can be grasped if either the downlink wavelength or the uplink wavelength is indicated. Although an example of using the correspondence between the MAC addresses and the wavelengths that are used for the downlink communication as the wavelength correspondence information is illustrated in the example of FIG. 2, the correspondence between the MAC addresses and the wavelengths that are used for the uplink communication may be used as the wavelength correspondence information.

The frame distribution unit 18 distributes the pieces of downlink data received from the higher-level network 4 to the PON control units 17-1 to 17-4 based on destinations of the pieces of downlink data, respectively. The frame distribution unit 18 is notified by the management unit 16 of correspondence between the destinations of the pieces of downlink data and the PON control units 17-1 to 17-4, and the frame distribution unit 18 holds the correspondence. The frame distribution unit 18 also outputs, to the higher-level network 4, the pieces of uplink data output from the PON control units 17-1 to 17-4.

The management unit 16 holds, for each of the PON control units 17-1 to 17-4, identification information of the corresponding ONU. The management unit 16 monitors a communication data amount, that is, traffic, between each of the PON control units 17-1 to 17-4 and the corresponding GNU. An example of a monitoring method for the traffic includes a method of monitoring, by the management unit 16, the data amount transmitted and received by each PON control unit during a certain period of time. The management unit 16 determines whether a deviation exists between the amounts of traffic of the PON control units 17-1 to 17-4. For example, the deviation is determined to exist between the amounts of traffic when each difference between the amounts of data, which are transmitted and received by the PON control units during a certain period of time, is obtained and the difference is equal to or greater than a threshold value. For instance, it is assumed that the data amount transmitted and received by the PON control unit 17-1 during a certain period of time is A, the data amount transmitted and received by the PON control unit 17-2 during a certain period of time is B, and A>B is satisfied. When A−B is equal to or greater than the threshold value, the management unit 16 determines that a difference between the amounts of traffic exists. Then, the amount of traffic of the PON control unit 17-1 is determined to be large, and the amount of traffic of the PON control unit 17-2 is determined to be small.

When the difference between the amounts of traffic is determined to exist, the management unit 16 performs control to switch, to the PON control unit having the small amount of traffic, a link destination of the GNU corresponding to the PON control unit having the large amount of traffic, that is, the ONU that has established a link to the PON control unit having the large amount of traffic. Specifically, the management unit 16 performs wavelength switching control in which the wavelength that is used in the ONU corresponding to the PON control unit having the large amount of traffic is switched to the wavelength that is used in the PON control unit having the small amount of traffic. More specifically, the PON control unit having the large amount of traffic is notified of ONU identification information that is identification information of the ONU to be subjected to the wavelength change and wavelength identification information that is information identifying a change destination wavelength. The PON control unit having the large amount of traffic is also instructed to change the wavelength. The PON control unit instructed by the management unit 16 to change the wavelength generates, as a control frame, a wavelength switching request for the ONU corresponding to the ONU identification information mentioned in the notification, and outputs the wavelength switching request to the corresponding optical transmitter. The ONU identification information indicating the destination ONU and the wavelength identification information after the switching are included in the wavelength switching request. Since the combination of the wavelengths for the transmission and the reception is fixed in this example, the wavelength identification information may be information identifying a pair of wavelengths, that is, a pair of wavelengths for the transmission and the reception. The wavelength identification information may be individual items of identification information individually designating the wavelengths for the transmission and the reception.

The management unit 16 acquires information that is used for the communication with the ONU from the PON control unit to which the ONU used to establish the link before the wavelength change. The management unit 16 then notifies the PON control unit after the wavelength change. Consequently, the PON control unit after the wavelength change can communicate with the ONU without exchanging the information that has been used for the communication with the ONU. The operation of the OLT 1 after the wavelength change is not limited to this operation, and the information that is used for the communication may be exchanged with the ONU using the changed wavelength.

The management unit 16 also manages the wavelength correspondence information, namely, the correspondence between the MAC addresses of the PON control units 17-1 to 17-4 and the wavelengths that are used by the PON control units 17-1 to 17-4. The management unit 16 also manages the correspondence between the destinations of the pieces of downlink data and the PON control units 17-1 to 17-4 for the frame distribution unit 18, and instructs the frame distribution unit 18 on the correspondence between the destinations of the pieces of downlink data and the PON control units 17-1 to 17-4. With regard to the correspondence between the destinations of the pieces of downlink data and the PON control units 17-1 to 17-4, for example, each of the PON control units 17-1 to 17-4 notifies the management unit 16 of the destination corresponding to the ONU acquired by the communication with the corresponding ONU. The destination of the downlink data is, for example, an address or the like of a user terminal (not illustrated) connected to each ONU.

Next, a configuration of the ONU 2-1 illustrated in FIG. 1 will be described. The GNU 2-1 includes a PON processing unit 21, an optical transmitter 25, and a WDM 26. The PON processing unit 21 performs control on the ONU side in accordance with the PON protocol. The optical transmitter 25 converts an electric signal to be transmitted to the OLT 1 into an optical signal. The WDM 26 multiplexes an optical signal to be transmitted to the OLT 1 and an optical signal received from the OLT 1. The ONU 2-1 also includes an optical receiver 24, a wavelength setting unit 22, a control frame extraction unit 23, and a display unit 27. The optical receiver 24 converts a received optical signal into an electric signal. The wavelength setting unit 22 sets the respective wavelengths for the optical receiver 24 and the optical transmitter 25. The control frame extraction unit 23 extracts the control frame from the electric signal converted by the optical receiver 24, and instructs the wavelength setting unit 22 on the wavelength set for the ONU 2-1 itself based on the control frame. The control frame extraction unit 23 also detects a malfunction, i.e. incorrect setting of the wavelength. The control frame extraction unit 23 serves as a malfunction detection unit. The display unit 27 is a display unit such as a light emitting diode (LED). A configuration of another ONU constituting the optical communication system is similar to the configuration of the ONU 2-1.

The WDM 26 performs a wavelength separation on the optical signal received from the OLT 1, and inputs, to the optical receiver 24, a signal in a wavelength band including the plurality of wavelengths which the optical receiver 24 can deal with. The WDM 26 also transmits, to the OLT 1, the optical signal input from the optical transmitter 25.

The optical receiver 24 is a wavelength-variable optical receiver that can deal with the four wavelengths of $\lambda_{11}$, $\lambda_{12}$, $\lambda_{13}$, and $\lambda_{14}$. The optical receiver 24 only needs to be able to deal with at least $\lambda_{11}$, $\lambda_{12}$, $\lambda_{13}$, and $\lambda_{14}$, and may be able to deal with five or more wavelengths. The optical receiver 24 converts, into an electric signal, an optical signal having a single wavelength set from among the plurality of wavelengths which the optical receiver 24 can deal with, and outputs the electric signal to the control frame extraction unit 23.

The optical transmitter 25 is a wavelength-variable optical transmitter that can deal with the four wavelength of $\lambda_{21}$, $\lambda_{22}$, $\lambda_{23}$, and $\lambda_{24}$. The optical transmitter 25 only needs to be able to deal with at least $\lambda_{21}$, $\lambda_{22}$, $\lambda_{23}$, and $\lambda_{24}$, and may be able to deal with five or more wavelengths. The optical transmitter 25 converts an electric signal input from the PON processing unit 21 into an optical signal having a single wavelength set out of the plurality of wavelengths which the optical transmitter 25 can deal with.

The PON processing unit 21 performs a process for the media access control (MAC) layer in accordance with the PON protocol. More specifically, for example, the PON processing unit 21 includes a buffer and accumulates uplink data received from a user terminal (not illustrated) or the like in the buffer. The PON processing unit 21 generates, based on the data amount accumulated in the buffer, a control frame for a band request in which an allocation request band for an uplink band is stored, and outputs the control frame to the optical transmitter 25. The PON processing unit 21 generates a data frame in which the uplink data accumulated in the buffer are stored, and outputs the data frame to the optical transmitter 25. The PON processing unit 21 also controls the optical transmitter 25 so that the optical transmitter 25 transmits the control frame and the data frame converted into the optical signals using the transmission time slot stored in the control frame for the band notification received from the OLT 1.

The control frame extraction unit 23 extracts the control frame from the electric signal input from the optical receiver 24. The control frame extraction unit 23 extracts and holds the wavelength correspondence information when the wavelength correspondence information is stored in the extracted control frame. The control frame extraction unit 23 also obtains, based on the wavelength correspondence information, the MAC address of the PON control unit of the OLT 1 corresponding to the respective wavelengths set for the optical receiver 24 and the optical transmitter 25 of the ONU 2-1 itself. The control frame extraction unit 23 then holds the obtained MAC address as a setting address. The setting address is identification information indicating one of the PON control units 17-1 to 17-4 to which the ONU 2-1 should be linked, that is, connected. When the extracted control frame is the control frame for the wavelength switching request, the control frame extraction unit 23 extracts, from the control frame, the wavelength identification information indicating the wavelength after the switching, and notifies the wavelength setting unit 22 of the wavelength after the switching and the wavelength change. The control frame extraction unit 23 also obtains the MAC address corresponding to the wavelength after the switching using the wavelength correspondence information. Then, the control frame extraction unit 23 updates the setting address to the obtained MAC address. When the transmission source MAC address stored in the extracted control frame is different from the setting address, the control frame extraction unit 23 determines that a failure of its ONU occurs, that is, the incorrect setting of the wavelength occurs, and instructs the display unit 27 to display an indication of the malfunction.

The wavelength setting unit 22 instructs, in response to the notification of the wavelength change, the optical receiver 24 and the optical transmitter 25 to change the corresponding wavelengths to the wavelengths after the switching mentioned in the notification.

The display unit 27 displays the occurrence of the malfunction when the display unit 27 is instructed by the control frame extraction unit 23 to display the indication of the malfunction. For example, in a case where the display unit 27 is composed of the LED, a lighting pattern of the LED for the malfunction is determined in advance, and the display unit 27 lights up in accordance with the lighting pattern of the LED for the malfunction when the display unit 27 is instructed by the control frame extraction unit 23 to display the indication of the malfunction.

Next, operation of the OLT 1 in the optical communication system of the present embodiment will be described. FIG. 3 is a flowchart illustrating exemplary operation of the OLT 1 of the present embodiment. Although operation of the PON control unit 17-1 is explained as an example, operation of each of the PON control units 17-2 to 17-4 is similar to the operation of the PON control unit 17-1. As illustrated in FIG. 3, the PON control unit 17-1 of the OLT 1 determines whether an ONU is newly connected (step S1). The determination as to whether an ONU is newly connected is performed in such a manner that, for example, each of the PON control units 17-1 to 17-4 of the OLT 1 periodically transmits a control frame for accepting a registration request from the ONU by means of broadcasting, and the newly connected ONU transmits the registration request in response to receiving the control frame. The PON control unit 17-1 of the OLT 1 can determine that the new ONU is connected when receiving the registration request. In this example, a control frame that is called a discovery GATE message defined by IEEE802.3 is used as the control frame for accepting the registration request from the ONU by means of broadcasting.

When it is determined that the ONU is newly connected (step S1: Yes), the PON control unit 17-1 of the OLT 1 performs a discovery process (step S2). The discovery process is defined by IEEE802.3 and a detailed description thereof is omitted. In the discovery process, the information that is used for the communication is exchanged between the PON control unit 17-1 of the OLT 1 and the newly connected ONU. By performing the discovery process, a link is established between the PON control unit 17-1 of the OLT 1 and the newly connected ONU.

After the discovery process, the PON control unit 17-1 of the OLT 1 notifies the ONU of the correspondence between the MAC addresses of the PON control units and the wavelengths (step S3). More specifically, the PON control unit 17-1 of the OLT 1 acquires, from the management unit 16, the wavelength correspondence information that is the correspondence between the MAC addresses of the PON control units and the wavelengths, generates the control frame in which the wavelength correspondence information is stored, and outputs the control frame to the optical transmitter 13-1. The optical transmitter 13-1 converts the control frame in which the wavelength correspondence information is stored into the optical signal. Any frame may be used as the control frame for giving the notification of the wavelength correspondence information. For example, an extension OAM frame defined by IEEE802.3 can be used. The control frame converted by the optical transmitter 13-1 into the optical signal is transmitted to the new ONU through the WDM 11 and the WDM 12.

After step S3, data transmission is started between the PON control unit 17-1 of the OLT 1 and the newly connected ONU (step S4). After the data transmission is started, as mentioned above, the PON control unit 17-1 of the OLT 1 transmits the uplink data to the higher-level network 4 through the frame distribution unit 18 in response to receiving the data message in which the uplink data is stored from the ONU. The PON control unit 17-1 also generates the data frame in which the downlink data are stored and transmits the data frame to the ONU in response to receiving the downlink data from the higher-level network 4 through the frame distribution unit 18.

The PON control unit 17-1 determines whether a wavelength switching instruction is made by the management unit 16 (step S5). As mentioned above, the management unit 16 monitors the traffic of each PON control unit. The management unit 16 determines whether the amounts of traffic differ between the wavelengths, namely, the PON control units. More specifically, for example, the amounts of traffic are determined to differ between the wavelengths when the difference between the data amounts transmitted and received by the respective PON control units during a certain period of time is equal to or greater than the threshold value, as mentioned above. When it is determined that the amounts of traffic differ between the wavelengths, one or more of the ONUs that have established the links to the PON control unit, which has the large amount of traffic among the PON control units having the amounts of traffic determined to differ, are selected as switching target ONUs. Then, the management unit 16 performs the control to switch the wavelength used by the switching target ONU to another wavelength. More specifically, the management unit 16 notifies the PON control unit having the large traffic of a wavelength switching instruction. The identification information of the switching target ONU and the identification information of the wavelength after the switching are included in the wavelength switching instruction.

When the wavelength switching instruction is made by the management unit 16 (step S5: Yes), the PON control unit 17-1 transmits the wavelength switching request to the switching target ONU (step S6), and proceeds to step S1. When the management unit 16 gives the notification of the wavelength switching instruction, the management unit 16 may acquire the information that is used for the communication with the switching target ONU from the PON control unit before the wavelength switching as mentioned above, and notify the PON control unit after the wavelength switching of the information. Alternatively, the notification of the information that is used for the communication with the switching target ONU may be given by the PON control unit before the wavelength switching to the PON control unit after the wavelength switching without passing through the management unit 16.

When it is determined in step S5 that the wavelength switching instruction is not made by the management unit 16 (step S5: No), the process proceeds to step S1. When it is determined in step S1 that the ONU is not newly connected (step S1: No), the process proceeds to step S5.

Next, operation of the ONU 2-1 in the optical communication system of the present embodiment will be described. Operation of another ONU is similar to the operation of the ONU 2-1. FIG. 4 is a flowchart illustrating exemplary operation of the ONU 2-1 of the present embodiment. First, when power is turned on in the ONU 2-1 (step S11), the wavelength setting unit 22 sets a transmission/reception wavelength, namely, the wavelengths for the optical receiver 24 and the optical transmitter 25, to an initial value (step S12). Consequently, the ONU 2-1 can perform the transmission and the reception using the wavelength set as the initial value.

Next, the ONU 2-1 performs the discovery process between the ONU 2-1 and the OLT 1 (step S13). As described above, the discovery process is started, for example, when the ONU 2-1 receives the control frame that is called the discovery GATE message and periodically transmitted from each of the PON control units 17-1 to 17-4 of the OLT 1. At this time, the wavelength for the ONU 2-1 is set to an initial value, and the discovery process is performed between the ONU 2-1 and one of the PON control units 17-1 to 17-4 corresponding to the wavelength of the initial value. For example, in a case where the wavelength for the ONU 2-1 for the reception, namely, the downlink communication, is set to $\lambda_{11}$ as the initial value, and the wavelength for the ONU 2-1 for the transmission, namely, the uplink communication, is set to $\lambda_{21}$ as the initial value, the ONU 2-1 performs the discovery process between the ONU 2-1 and the PON control unit 17-1. After that, the ONU 2-1 communicates with the PON control unit 17-1 until the ONU 2-1 receives the wavelength switching request.

Next, the ONU 2-1 receives, from the OLT 1, the wavelength correspondence information that is the correspondence between the MAC addresses of the PON control units of the OLT 1 and the wavelengths, and the control frame extraction unit 23 holds the wavelength correspondence information (step S14). The ONU 2-1 then starts data transmission between the ONU 2-1 and the OLT 1 (step S15).

The control frame extraction unit 23 of the ONU 2-1 determines whether the wavelength switching request is received from the OLT 1 (step S16). When the wavelength switching request is received from the OLT 1 (step S16: Yes), the control frame extraction unit 23 instructs the wavelength setting unit 22 on the wavelength switching, thereby performing the wavelength switching on the optical receiver 24 and the optical transmitter 25 (step S17). The control frame extraction unit 23 also updates, based on the wavelength switching request and the wavelength correspondence information, the setting address to the MAC address corresponding to the wavelength identification information after the switching stored in the wavelength switching request (step S18).

Then, the control frame extraction unit 23 of the ONU 2-1 determines whether the transmission source MAC address of the received control frame is the same as the setting address (step S19). When the transmission source MAC address of the received control frame is the same as the setting address (step S19: Yes), the process returns to step S16. When the transmission source MAC address of the received control frame is not the same as the setting address (step S19: No), the control frame extraction unit 23 determines that a malfunction occurs, and instructs the display unit 27 to display the occurrence of the malfunction. The display unit 27 displays the occurrence of the malfunction (step S20). Then, the control frame extraction unit 23 instructs the PON processing unit 21 to stop the transmission of data, and the PON processing unit 21 stops the transmission of data (step S21).

In step S19 of FIG. 4, assuming that m is an integer of two or more, the MAC address may be determined to coincide with the setting address when all the transmission source MAC addresses of the successively received m control frames coincide with the setting address. In other words, when even one of the transmission source MAC addresses of the m control frames does not coincide with the setting address, it is determined that the transmission source MAC address does not coincide with the setting address in the determination of step S19.

FIG. 5 is a chart illustrating exemplary operation of the OLT 1 and ONU 2-1 on the occurrence of the malfunction in the ONU 2-1. In FIG. 5, the illustration of a part of the processes illustrated in FIGS. 3 and 4 is omitted for simplifying the drawing. In FIG. 5, the ONU 2-1 sets the wavelengths for the transmission and the reception to the initial values $\lambda_{11}$ and $\lambda_{12}$ (step S31), respectively. In this example, the initial values of the downlink wavelength and the uplink wavelength for the ONU 2-1 are assumed to be $\lambda_{11}$ and $\lambda_{12}$, respectively. Step S31 is the process of step S12 in FIG. 4.

Next, the PON control unit 17-1 of the OLT 1 and the ONU 2-1 perform the discovery process (step S32). Step S32 is the process of step S2 in FIG. 3 and step S13 in FIG. 4.

Next, the PON control unit 17-1 of the OLT 1 notifies the ONU 2-1 of the correspondence between the MAC address of the PON control unit and the wavelength (step S33). Step S33 is the process of step S3 in FIG. 3. Then, the PON control unit 17-1 of the OLT 1 and the ONU 2-1 start the data transmission (step S34). Step S34 is the process of step S4 in FIG. 3 and step S15 in FIG. 4.

At this time, the management unit 16 of the OLT 1 determines that a difference exists between the amount of traffic of the PON control unit 17-1 and the amount of traffic of the PON control unit 17-2, and that the amount of traffic of the PON control unit 17-1 is larger than the amount of traffic of the PON control unit 17-2. The management unit 16 selects the ONU 2-1 as the switching target ONU, and notifies the PON control unit 17-1 of the wavelength switching instruction. The wavelengths after the wavelength switching are $\lambda_{21}$ and $\lambda_{22}$ corresponding to the PON control unit 17-2.

The PON control unit 17-1 transmits, to the ONU 2-1, the wavelength switching request for giving the instruction for the switch to $\lambda_{21}$ and $\lambda_{22}$ (step S35). Step S35 is the process of step S6 in FIG. 3. At this time, although the ONU 2-1 receives the wavelength switching request and performs the wavelength switching of step S17 illustrated in FIG. 4, it is assumed that the wavelength for the optical receiver 24 is not changed due to a malfunction (step S36).

Then, the ONU 2-1 performs the process of step S18 in FIG. 4, that is, updates the setting address to the address #2 which is the MAC address corresponding to the PON control unit 17-2 (step S37). Meanwhile, the PON control unit 17-1 of the OLT 1 communicates with an ONU other than the ONU 2-1, and transmits, as the optical signal having the wavelength $\lambda_{11}$, the control frame in which the address #1 corresponding to the PON control unit 17-1 itself is stored as the transmission source MAC address (step S38).

In the ONU 2-1, as described in step S36, the wavelength for the optical receiver 24 has not been changed. Therefore, the control frame extraction unit 23 of the ONU 2-1 receives the control frame corresponding to the optical signal having the wavelength $\lambda_{11}$. The control frame extraction unit 23 determines that the MAC address of the received control frame does not coincide with the setting address (step S39), and instructs the display unit 27 to display the malfunction, and the display unit 27 displays the occurrence of the malfunction (step S40). Then, the ONU 2-1 stops the transmission of data (step S41). Step S39 is step S19 in FIG. 4 in which No is determined, and steps S40 and S41 are respectively the processes of steps S20 and S21 in FIG. 4.

For example, a GATE message defined by IEEE802.3 can be used as the control frame used in step S19. FIG. 6 is a diagram illustrating exemplary operation after the start of the data transmission between the GNU 2-1 and the OLT 1 with the use of the GATE message. As illustrated in FIG. 6, the PON control unit 17-1 of the OLT 1 periodically transmits, to the GNU that has established a link to the PON control unit 17-1 itself, the GATE message that is a band allocation notification (steps S51, S53, and S56). Information indicating a transmission time slot in which the uplink communication is permitted for the ONU is stored in the GATE frame. The transmission time slot includes a transmission time slot for transmitting a REPORT message that is a control frame for giving a notification of the uplink band requested by the ONU and a transmission time slot for transmitting the data.

In response to receiving the GATE message, the ONU transmits, to the OLT 1, the REPORT message in which the requested uplink band is stored using the transmission time slot for transmitting the REPORT message (steps S52 and S54). The ONU also transmits the data frame in the transmission time slot for transmitting the data (step S55). The PON control unit 17-1 of the OLT 1 determines the transmission time slot for each ONU based on the uplink band mentioned in the notification by the REPORT message, and gives the notification of the transmission time slot using the above-mentioned GATE message. The PON control unit 17-1 of the OLT 1 and the ONU perform the data transmission by repeating the above-mentioned process.

As described above, in the present embodiment, the PON control units 17-1 to 17-4 of the OLT 1 notify the ONUs of the wavelength correspondence information that is the correspondence between the MAC addresses of the PON control units 17-1 to 17-4 and the wavelengths. Then, when receiving the wavelength switching request from the OLT 1, the ONU updates, based on the wavelength switching request and the wavelength correspondence information, the setting address that is the MAC address of the PON control unit to which the ONU itself should be connected. When the transmission source MAC address stored in the received control frame does not coincide with the setting address, the malfunction, namely, the incorrect setting of the wavelength, is detected. In this manner, the ONU of the present embodiment can detect the incorrect setting of the wavelength.

Although the above description has described the example in which the OLT 1 and the ONU use the control process defined by IEEE802.3, the control process that is performed by the OLT 1 and ONU is not limited to the process defined by IEEE802.3, and may be a control process defined by the ITU-T. For example, the control frame for the band allocation notification may not be the GATE frame, and may be a GRANT frame.

In the above description, the ONUs 2-1 to 2-n transmit the band requests, and the OLT 1 allocates the uplink band, namely, the transmission time slots, to the respective ONUs 2-1 to 2-n based on the band requests. However, the method of assigning the uplink band is not limited to the method that is based on the band requests.

In the above description, the PON processing unit 21 is instructed to stop the transmission of the data when the control frame extraction unit 23 determines that the malfunction occurs. However, the stopping method is not limited to this example, and the uplink communication may be stopped by controlling the optical transmitter 25 to be stopped.

Although the above description has described the example in which both the transmission and reception wavelengths for the ONUs 2-1 to 2-n are switched at one time. However, the above-mentioned malfunction detection method can also be applied to a case where only the reception wavelengths for the ONUs 2-1 to 2-n, namely, the wavelengths used for the downlink communication, are switched.

The display unit 27 is not limited to the LED, and may be a liquid crystal monitor or the like. In place of the display unit 27, a unit that gives a notification of the malfunction by means of sound may be provided.

The above description has described the example in which the four pairs of wavelengths are used for the uplink and downlink communication in the optical communication system. However, the number of wavelengths that are used for the uplink and downlink communication in the optical communication system is not limited to the four pairs, and may be a different number of pairs.

In the above description, whether the malfunction occurs or not is determined using the MAC addresses of the PON control units 17-1 to 17-4. However, identification information other than the MAC address may be used as long as the identification information can identify each of the PON control units 17-1 to 17-4 serving as the transmission source of the control frame. In a case where the identification information other than the MAC address is used, the wavelength correspondence information includes correspondence between items of identification information of the PON control units 17-1 to 17-4 and the wavelengths, and the control frame extraction unit 23 holds setting identification information instead of the setting address, and updates the setting identification information based on the wavelength switching request and the wavelength correspondence information. In other words, the control frame extraction unit 23 obtains the setting identification information after the wavelength switching based on the wavelength switching request and the wavelength correspondence information.

REFERENCE SIGNS LIST

1 OLT, 2-1 to 2-*n* ONU, 3 splitter, 4 higher-level network, 11, 12, 14, 26 WDM, 13-1 to 13-4, 25 optical transmitter, 15-1 to 15-4, 24 optical receiver, 16 management unit, 17-1 to 17-4 PON control unit, 18 frame distribution unit, 21 PON processing unit, 22 wavelength setting unit, 23 control frame extraction unit, 27 display unit.

The invention claimed is:

1. A slave station device to receive an optical signal from a master station device including two or more master station control units, the slave station device comprising:
   an optical receiver capable of dealing with a plurality of optical wavelengths to receive, from the master station device, an optical signal having a single optical wavelength set out of the plurality of optical wavelengths, and convert the received optical signal into an electric signal;
   a processor to execute a program; and
   a memory to store the program which, when executed by the processor, performs processes of,
   extracting and holding wavelength correspondence information, which is stored in the electric signal, indicating correspondence between the master station control units and the optical wavelengths used for transmitting control signals generated by the respective master station control units,
   extracting information on another optical wavelength after wavelength switching based on a wavelength switching request included in the electric signal, the wavelength switching request requesting a switch of the wavelength for the optical receiver,
   obtaining setting identification information that is identification information of the master station control unit based on the extracted information of the another optical wavelength and the wavelength correspondence information, and
   determining whether a malfunction occurs based on identification information of the master station control unit that is a transmission source of the control signal stored in the control signal, and on the setting identification information.

2. The slave station device according to claim 1, wherein the identification information of the master station control unit is a media access control address of the master station control unit.

3. The slave station device according to claim 1, wherein the processor determines that the malfunction occurs when the identification information stored in the received control signal does not coincide with the setting identification information.

4. The slave station device according to claim 1, wherein the processor determines that the malfunction occurs when at least one of items of the identification information respectively stored in a plurality of the control signals successively received does not coincide with the setting identification information.

5. The slave station device according to claim 1, comprising a display unit capable of displaying occurrence of the malfunction, wherein
   the processor instructs the display unit to display the occurrence of the malfunction when the malfunction detection unit determines that the malfunction occurs.

6. The slave station device according to claim 1, wherein the processor determines whether the malfunction occurs based on the identification information of the master station control unit that is the transmission source of the control signal stored in the control signal that is a band allocation notification, and on the setting identification information.

7. An optical communication system comprising a master station device and a slave station device, the slave station device including an optical receiver capable of dealing with a plurality of optical wavelengths to receive an optical signal transmitted from the master station device, wherein
   the master station device includes:
   two or more master station control units to generate control signals that are transmitted to the slave station device; and
   two or more optical transmitters corresponding to the respective master station control units,
   the two or more optical transmitters convert the control signals generated by the corresponding master station control units into optical signals having different optical wavelengths, and transmit the optical signals to the slave station device,
   the control signal includes identification information of the master station control unit,
   each master station control unit generates the control signal in which wavelength correspondence information that is correspondence between the identification information of the master station control units and the optical wavelengths respectively corresponding to the master station control units is stored, and generates the control signal in which a wavelength switching request that requests a switch of the optical wavelength for the optical receiver in the slave station device is stored, and
   the slave station device includes:
   the optical receiver capable of dealing with the plurality of optical wavelengths to receive, from the master station device, an optical signal having a single optical wavelength set out of the plurality of optical wavelengths, and convert the received optical signal into an electric signal;
   a processor to execute a program; and
   a memory to store the program which, when executed by the processor, performs processes of,
   extracting and holding wavelength correspondence information stored in the control signal that is the electric signal,
   extracting information on another optical wavelength after wavelength switching based on the wavelength switching request included in the electric signal, obtaining setting identification information that is identification information of the master station control unit based on the extracted information of the another optical wavelength and the wavelength correspondence information, and determining whether a malfunction occurs based on the identification information of the master station control unit that is a transmission source of the control signal stored in the control signal, and on the setting identification information.

8. A malfunction detection method for an optical communication system including a master station device having two or more master station control units to generate control signals and a slave station device having an optical receiver capable of dealing with a plurality of optical wavelengths to receive an optical signal transmitted from the master station device, the malfunction detection method comprising:

a control signal generation step of generating, by the master station control unit of the master station device, the control signal in which identification information of the master station control unit is stored;

a transmission step of converting, by the master station device, the control signal into an optical signal having an optical wavelength that differs for each master station control unit, and transmitting the optical signal to the slave station device;

a wavelength correspondence information transmission step of transmitting, by the master station device to the slave station device, wavelength correspondence information that is correspondence between the identification information of the master station control units and the optical wavelengths corresponding to the master station control units;

a wavelength switching request transmission step of transmitting, by the master station device to the slave station device, a wavelength switching request that requests a switch of the optical wavelength for the optical receiver in the slave station device;

a wavelength correspondence information holding step of holding, by the slave station device, the wavelength correspondence information received from the master station device;

an identification information extraction step of extracting, by the slave station device when receiving the wavelength switching request from the master station device, the optical wavelength after wavelength switching instructed in the wavelength switching request, and obtaining setting identification information that is identification information of the master station control unit to which the slave station device itself should be connected after the wavelength switching based on the extracted optical wavelength after the wavelength switching and the wavelength correspondence information; and a malfunction detection step of detecting, by the slave station device, whether a malfunction occurs in the slave station device based on the identification information of the master station control unit that is a transmission source of the control signal stored in the control signal received from the master station device through the optical receiver after receiving the wavelength switching request, and on the setting identification information.

* * * * *